United States Patent
Trappe et al.

(10) Patent No.: US 6,725,163 B1
(45) Date of Patent: Apr. 20, 2004

(54) METHOD FOR PROCESSING SEISMIC MEASURED DATA WITH A NEURONAL NETWORK

(75) Inventors: Henning Trappe, Isernhagen (DE); Carsten Hellmich, Hannover (DE); Marc Föll, Hannover (DE)

(73) Assignee: Henning Trappe, Isernhagen (DE)

(*) Notice: Subject to any disclaimer, the term of this patent is extended or adjusted under 35 U.S.C. 154(b) by 0 days.

(21) Appl. No.: 10/070,586
(22) PCT Filed: Aug. 16, 2000
(86) PCT No.: PCT/DE00/02796
§ 371 (c)(1), (2), (4) Date: Mar. 8, 2002
(87) PCT Pub. No.: WO01/20364
PCT Pub. Date: Mar. 22, 2001

(30) Foreign Application Priority Data

Sep. 10, 1999 (DE) .......................................... 199 43 325

(51) Int. Cl.⁷ ................................................. G01V 1/40
(52) U.S. Cl. ............................................. 702/9; 702/14
(58) Field of Search ................................ 702/14, 16, 9; 367/135; 382/158

(56) References Cited

U.S. PATENT DOCUMENTS

| 3,496,382 | A | * | 2/1970 | Hendrix ........................ 706/42 |
| 5,373,486 | A | | 12/1994 | Dowla et al. ................ 367/135 |
| 5,729,662 | A | * | 3/1998 | Rozmus ......................... 395/23 |
| 5,859,925 | A | | 1/1999 | Yaeger et al. ................ 382/158 |
| 5,862,513 | A | * | 1/1999 | Mezzatesta et al. ............ 702/9 |
| 5,940,529 | A | * | 8/1999 | Buckley ...................... 382/155 |
| 5,940,777 | A | | 8/1999 | Keskes ......................... 702/16 |

FOREIGN PATENT DOCUMENTS

| WO | WO92/17849 | 10/1992 | ............ G06F/15/18 |
| WO | WO97/39367 | 10/1997 | ............ G01V/1/32 |
| WO | WO/20364 | 3/2001 | ............ G01V/1/30 |

OTHER PUBLICATIONS

Dr. M. Turhan (Tury) Taner, Kohonen's Self Organizing Networks with "Conscience" Nov. 1997 In Rock Solid Images complete document with pp. 1–7.*
Kohonen, T.T. (1984) Self–Organisation and Associative Memory, 1. edition, Springer Verlag Heidelberg. (To Follow).
Ritter, H. et al. (1991) Neuronale Netze (Neural Nets), Addison–Wesley. (To Follow).
Trappe, H. (1994) "Potential Neuronaler Netze in der Kohlenwasserstoffexploration und –Produktion (Potential of Neural Nets in the Exploration and Production of Hydrocarbons)", Conference Volume of the 14$^{th}$ Mintrop Seminar.
Trappe, et al. (5/26–30/77) "Areal Prediction of Porosity Thickness from 3D Seismic Data by Means of Neural Networks" (EAGE 59$^{th}$ Conf and Technical Exhib–Geneva, Switzerland.
DeGroot, et al. (1988) "Evaluation of Remaining Oil Potential with 3D Seismic Using Neural Networks", EAGE Meeting and Exhibition, Leipzig.
Kohonen, T.T (1984) Self–Organisation and Associative Memory, 1. edition, Springer Verlag Heidelberg. (Enclosed).
Ritter, H. et al. (1991) Neuronale Netze (Neural Nets), Addison–Wesley. (Enclosed).

* cited by examiner

*Primary Examiner*—John Barlow
*Assistant Examiner*—Victor J. Taylor
(74) *Attorney, Agent, or Firm*—Collard & Roe, P.C.

(57) ABSTRACT

The invention relates to a method for processing a 3-D measurement data set provided with seismic attributes, by means of a neural network, whereby a self-organizing map is trained with selected training data, and the data to be examined are classified according to the self-organizing map. In this connection, the measurement data are processed by way of sub-volumes comprising a spatial environment of each sample. The classification is stored in a result data set, and displayed, for example in a two-dimensional map (FIG. 3).

23 Claims, 3 Drawing Sheets

METHOD FOR PROCESSING SEISMIC MEASURED DATA WITH A NEURONAL NETWORK

CROSS-REFERENCE TO RELATED APPLICATIONS

Applicants claim priority under 35 U.S.C. §119 of German Application No. 199 43 325.9 filed Sep. 10, 1999. Applicants also claim priority under 35 U.S.C. §165 of PCT/DE00/02796 filed Aug. 16, 2000. The international application under PCT article 21(2) was not published in English.

BACKGROUND OF THE INVENTION

1. Field of the Invention

The invention relates to a method for processing a 3-D measurement data set provided with seismic attributes, by means of a neural network, whereby a self-organizing map is trained with selected training data, and the data to be examined are classified according to the self-organizing map.

2. The Prior Art

Neural nets are a general term for a multitude of methods, which follow cognitive learning processes. A discrimination of these methods is based on the type of the learning. In so-called "supervised learning", both the input and output are prescribed. In the network type that is relevant to this invention, i.e. the self-organizing map, the learning process is unsupervised, and serves to establish relations within the data, and to exploit them. Self-organizing maps originate from the attempt to develop explanations for neural processes in the brain. A stochastic model of that type is described, for example, in the publication Kohonen, T T., 1984, Self-Organisation and Associative Memory, 1. edition, Springer Verlag Heidelberg. It is further referred to the publication Ritter, H., Martinetz, T., and Schulten, K., 1991, Neuronale Netze (Neural Nets), Addison-Wesley.

In the model by Kohonen, all neurons are fully connected to the input. The intensity of the coupling to the input is variable, and is called the weight. Among themselves, the neurons are in each case coupled to their neighbors. If a training pattern is applied, all neurons enter into competition. The neuron specified by the largest similarity with the training pattern wins and adapts its weight towards the pattern. The similarity is computed, for example, by evaluating the scalar product between the training pattern and the weight vector. All other neurons adapt their weights with less strength. In this context, the adaptation strength depends on the distance of the individual neuron to the winner neuron on the neural map. The distance is determined by the number of neurons that are located between the neuron and the winner neuron. Now, further training patterns are applied, and the adaptation step is repeated for each pattern. In this process, the neurons organize themselves towards the training patterns. At the same time, the internal coupling causes all neurons to be involved in the process, and similar training patterns to be imaged to spatially neighbouring neurons.

After the training, the input patterns can be related to the neurons. In this respect, a winner neuron is determined for each training pattern. Desired characteristics of the training patterns can be assigned to the neurons as reference values. In the normal case, the number of input patterns is larger than the number of the neurons, so that several input patterns are imaged to one neuron. The reference values are then formed by the synthesis of the corresponding input patterns.

A classification of unknown input data again takes place on the basis of the principle of competition. The pattern is applied to the net, and the reference pattern with the largest accordance is selected. Characteristics of the reference pattern, if existing, can then be transferred to the input pattern.

This generally known method is as well suited as a specialized evaluation method for the complex signal relations in seismic data, in which noisy, non-linear signals have to be processed. In the publication Trappe, H. 1994, Potential neuronaler Netze in der Kohlenwasserstoffexploration und -produktion (Potential of neural nets in the exploration and production of hydrocarbons), conference volume of the 14$^{th}$ Mintrop Seminar, the application potential of neural nets for the field of exploration and production of hydrocarbons is presented. In this publication, an example of a self-organizing neural process for the seismic reservoir characterisation is given as well.

From the publication Trappe, H., and Hellmich, C., "Areal Prediction of Porosity Thickness from 3D Seismic Data by Means of Neural Networks" (EAGE 59$^{th}$ Conference and Technical Exhibition—Geneva, Switzerland, May 26–30 1977), the application of a neural, self-organizing type of a network for the prediction of the local reservoir quality from 3-D seismic data is known. The aim of the investigation is to establish from seismic data, or from attributes derived from seismic data, a map of porosity thicknesses along an interpreted horizon, here along the Rotliegendes. The amplitude, the lateral variation of the amplitude, and the acoustic impedance obtained from 3-D seismic inversion are used as input data. It is a disadvantage that the processing is limited to a narrowly limited zone, and that only a constant time, or an interpreted horizon is considered.

From the publication De Groot, P., Krajewski, P., and Bischoff, R., 1988, "Evaluation of Remaining Oil Potential with 3D Seismic Using Neural Networks", EAGE Meeting and Exhibition, Leipzig, the use of an unsupervised neural network for the classification of the pore-fill from seismic data is known. In this context, short traces segments around the investigated horizon are used for the training, and for the classification.

Moreover, from U.S. Pat. No. 5,373,486, a method for the identification and classification of seismological sources, e.g. for the earthquake forecast, or for the verification of tests of nuclear weapons, is known. In this method, a signal arriving at the seismograph is transformed as a time series into a spectogram, and finally into a phase invariant representation by a two-dimensional Fourier transformation. These processed data are presented to a self-organising neural network.

From U.S. Pat. No. 5,940,777 a method for the automatic recognition of seismic patterns is known, in which single seismic trace segments are to be recognized by a self-organizing neural network, where the one-dimensional neural network (chain) exhibits just as much elements, as different patterns are available.

All previously mentioned, known methods have in common, that only single seismic data points (samples) or short seismic trace segments are used, which always refer to only one single seismic trace. It is a disadvantage that the local environment is not considered in the assignment of information derived from the seismic data.

PCT No. WO 97/39367 describes a method and an apparatus for the seismic signal processing and exploration, in which a seismic 3D volume is subdivided into cells. In the simplest case, these cells are cube-shaped. From the trace segments that are located in a cell and that amount to at least two in a cell, a correlation matrix is formed by sums of the differences between inner and outer products of the sets of values from the trace segments. The quotient formed by the highest eigenvalue of the matrix and the sum of all eigenvalues is then calculated as the measure of coherency. As the result, again a 3-D data volume is created, comprised of coherency values. Here sub-volumes are indeed considered, but without application of a neural net.

In the known methods, the training examples needed for the determination of the weights in the neural net, are extracted along a horizon or in a relatively narrow zone around the reservoir of interest. The remaining data is treated in the same way in the classification, which follows the training. The training examples are thus specifically selected, and for this selection, seismic data that was interpreted with other methods before, must be available for the determination of a horizon, or a reservoir. Moreover, the specific selection of training examples implies the risk that physical characteristics of the subsurface which strongly deviate from the selected characteristics, remain without consideration, or at least under-represented, in the classification.

In the state of art, the internal structure and the number of classes of the neural network are furthermore defined before the training. It often turns out, however, that a pre-defined network does not allow a representative classification of the measurement data. Then a multitude of training runs is required in order to find the correct parameters, namely the number of classes, the selection of attributes, and the selection of training examples, and in order to fix these parameters for the processing of the input data.

SUMMARY OF THE INVENTION

Therefore, it is an object of the invention to provide a method as mentioned initially, for the processing of a seismic measurement data set by means of a neural network, where in said method, an environment-related evaluation is achieved.

Because the training data are selected randomly from the measurement data set, an automated selection of training data shall be ensured. The selection of training examples is thus not confined to a horizon, or to a chosen reservoir zone, so that no prior interpretation takes place. Patterns, or training data, respectively, with extreme value ranges are also entered into the training by the random choice. Situations which are considered to have very low probability, are thus considered as well. The training data thus comprise a much larger dynamic range, so that trends in amplitude behavior, for example, can be considered as well. If the training data are selected randomly from a pre-defined time/depth window of the measurement data set, the selection can be confined to a limited region of the total 3D volume, in an evaluation aiming at this limited region.

Through the processing of the measurement data by means of a spatial environment of each measurement data point, it is achieved, that the lateral change of the seismic signal is considered as well besides the vertical distribution of amplitude information, as a significant parameter for the characterisation of the subsurface. Hence, because of the knowledge of the lateral changes of the geology, statements on the thickness of sand bodies, or of the sedimentary environment, respectively, can be determined from the distribution of the values in the sub-volume. The method according to the invention allows a classification of seismic sub-volumes, or of sub-volumes provided with attributes derived from the seismic data, in an automatic evaluation. In this context, a volume assigned to the seismic data point is considered as input data. After-completion of the training process, a classification result can be assigned to each data point. In the automatic evaluation, similar seismic sub-volumes are then assigned to the same, or to neighboring classes.

Through the evaluation in sub-volumes, it is taken into account, among other things, that the reflected seismic energy cannot be assigned to exactly one point of the subsurface, due to the limits of seismic resolution, and to the used numerical methods. On the contrary, this point is better described by its local environment, and in this respect the consideration of dependencies in a sub-volume is advantages as compared to idealized one-dimensional earth models.

Each sub-volume preferably consists of a measurement data point (reference point), and a pre-defined number of measurement data points (samples) from the environment of the reference point, and a pre-defined, relative location of said data points with respect to the reference point. For a pre-defined, fixed number of data points in the sub-volume, the dimension of the weight vector is defined equal to this number, and is not altered any more. The interaction between the neurons as determined by the weight vectors, thus considers the environmental dependencies in the sub-volume.

The sub-volumes have, for example, square-stone shape, e.g. with 3×3×3 data points, or the shape of an ellipsoid with its main axes centered at the reference point. Thus a practicable and uniformly balanced consideration of the data points in the environment of the investigated data point (reference point) is achieved. The square-stone or cubic shape facilitates the assignment of data to sub-volumes in the common 3-D measurement data sets with a cubic structure.

The neural network is trained with a pre-defined number of training data.

Nevertheless, in order to carry out a selection with respect to certain characteristics in the investigated 3-D measurement data set, the selection of the training data can be confined to pre-defined inlines and crosslines, and the training data can be randomly selected from a target layer of the measurement data set that is defined by two enclosing horizons. This procedure shall achieve, for example, a restriction of the selection of training data to geologically reasonable regions. In addition, the use of non-uniform acquisition methods within the 3-D measurement data set, e.g. dynamite seismics, vibrator seismics, land seismics—shallow water seismics, etc., can be considered by a correspondingly assigned, i.e. restricted selection of the training data in the evaluation.

A dedicated selection of training data can further be achieved by determining characteristic parameter values for all sub-volumes of the measurement data set, and by randomly selecting the training data by means of pre-defined criteria that are derived from the characteristic parameter values.

As characteristic parameters, it may be chosen, for example: mean amplitude, mean absolute amplitude, coherency, dip (layer inclination), azimuth, proximity to faults, difference from smallest and largest amplitude value, etc . . . In this context, several characteristic parameters may be combined for the determination of selection criteria.

In order to obtain a representative selection of training examples from the investigated 3-D measurement data set, the distribution of characteristic parameter values from all sub-volumes of the measurement data set is determined, and the training data are selected such that the distribution of the characteristic parameter values from the training data corresponds to the total distribution.

Because the distribution of characteristic parameter values from all sub-volumes is determined from the measurement data set, and that the training data are selected randomly such that the distribution of the characteristic parameter values from the training data corresponds to a distribution chosen previously, a non-representative selection of training data is deliberately presented. This non-representative selection can be desired, for example, if the classification objective is the detection of faults, whereas the data points in the proximity of faults constitute a very small portion only of the measurement data set.

In order to avoid a misdirection of the mutual dependency in the neural net at the start of the training, the weight vectors are filled with random numbers at the start of the training.

In case of similar geological situations, the weight vectors may be adopted by way of exception from an earlier, similar computation. The neural network can also be initialized by a training result that was created already before, such that the total course of the training must not be repeated, e.g. in the case of an addition of new training data.

By carrying out the training for such a duration, until a certain error criterion is fulfilled, a high quality of the data evaluation can be ensured. As an error criterion in this context, the mean error with respect to the used input data can be determined as the sum of the individual errors of each single input pattern, divided through the total number of input patterns. If the value falls below a pre-defined maximum error, the training is stopped.

If this error criterion is not fulfilled, the number and/or the connection of the neurons is altered in the course of the training. Preferably, the number of neurons is increased at first in this context, and in a second step, the network connections are increased. As an alternative, the distance between the weight vectors of two neighboring neurons can as well be chosen as the criterion for the insertion of neurons, and of connections.

In a neural net with a two-dimensional grid configuration, a neighborhood with sets of four, our eight neurons can be formed, except for the neurons located at the edge. However, the two-dimensional grid configuration can exhibit any arbitrary network connections.

If the neural net is arranged in the form of a torus, a structure is defined in which negative edge effects are avoided. If a neural net is formed as a chain, each neuron possesses two neighbors, except for the first, and last neuron. It is advantageous in this context, that an assignment of ordinal numbers in increasing order to the neurons is possible, and thus, a graphical representation, for example a color scale, can easily be assigned as well. In a further embodiment, several chains can be provided.

Alternatively, the neural net can be embodied as a three-dimensional grid. In this context, a connection of neighbouring neurons by means of weight vectors is conceivable as a neighbourhood with a set of six neurons and with connective relations that are arranged orthogonally only, in an orthogonal grid configuration.

Because each neuron possesses a unique ordinal number, and to each measurement data point, the corresponding ordinal number of the winner neuron, and an individual error, given as the distance between the measurement data point and the winner neuron, are assigned, a unique relation of a pair of result values to each measurement data point (sample) is provided. Concerning the individual error of an input pattern, the distance of the input datum to all neurons is determined. Then, the smallest distance is selected as individual error; whereas the neuron connected to this smallest distance simultaneously is the winner neuron, which represents the corresponding ordinal number. Common distance measures are the scalar product of vectors, or the Euclidian distance.

The result data set which is provided with ordinal numbers and error values, and from which maps or slices can be extracted for a 2D display, is preferably entered in digital form to further processing.

In order to allow a graphical representation of the ordinal numbers that are assigned in the result data set, the ordinal numbers of the neurons are computed as polar coordinates in case of a two-dimensional configuration of the neurons. In this context, the angle co-ordinate of a neuron determines a hue, and the radius determines a saturation. The origin of the co-ordinate system is defined in the center of the neural net. The color intensity can be selected constant, or equal to the saturation, for example. Thus, each ordinal number occurring in the neural net is represented by the hue -and saturation in a visually recognizable way. Neurons that are neighbors to each other, as-well exhibit similar hues and similar saturations.

In case of a three-dimensional configuration of the neurons, the hue, saturation, and intensity are correspondingly derived from ordinal numbers computed in spherical co-ordinates. Here as well, the origin of the co-ordinate system is defined in the centre of the configuration of the neurons.

Besides the 3D measurement data set provided with seismic amplitudes, other data with attributes derived from seismic data can as well be used as input data sets, e.g. a volume of acoustic impedance, coherency, dip and/or azimuth.

BRIEF DESCRIPTION OF THE DRAWINGS

In the following, an application example of the invention is explained with reference to the attached figures. It is to be understood that the drawings are for example only and not a description of the limits of the invention. In the drawings.

DETAILED DESCRIPTION OF THE PREFERRED EMBODIMENTS

Figure 1:
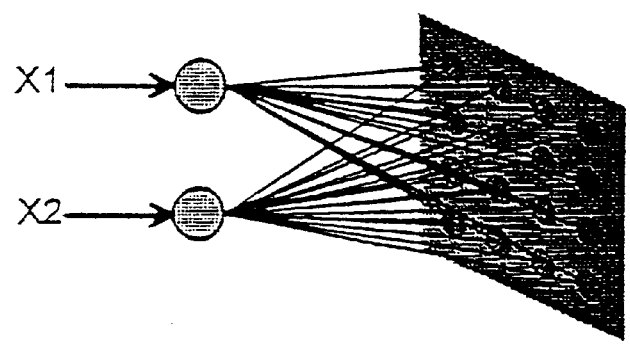
FIG. 1 schematically represents two seismic attributes, that are imaged to a neural map.

In FIG. 1, two input data patterns (training patterns) $X_1$, $X_2$, which are provided with seismic attributes, are displayed by way of example. The neural map is displayed as an areal, two-dimensional structure with 4×4 neurons. The neurons are mutually coupled with their neighbours, which is not displayed in FIG. 1 for the sake of clearness. Moreover, all neurons are connected to the input, such that on application of the training patterns $X_1$, $X_2$, all neurons enter into competition. The neuron specified by the largest accordance with the training pattern, wins and adapts its weights towards the pattern. All other neurons adapt with less strength according to their weights.

Figure 2:
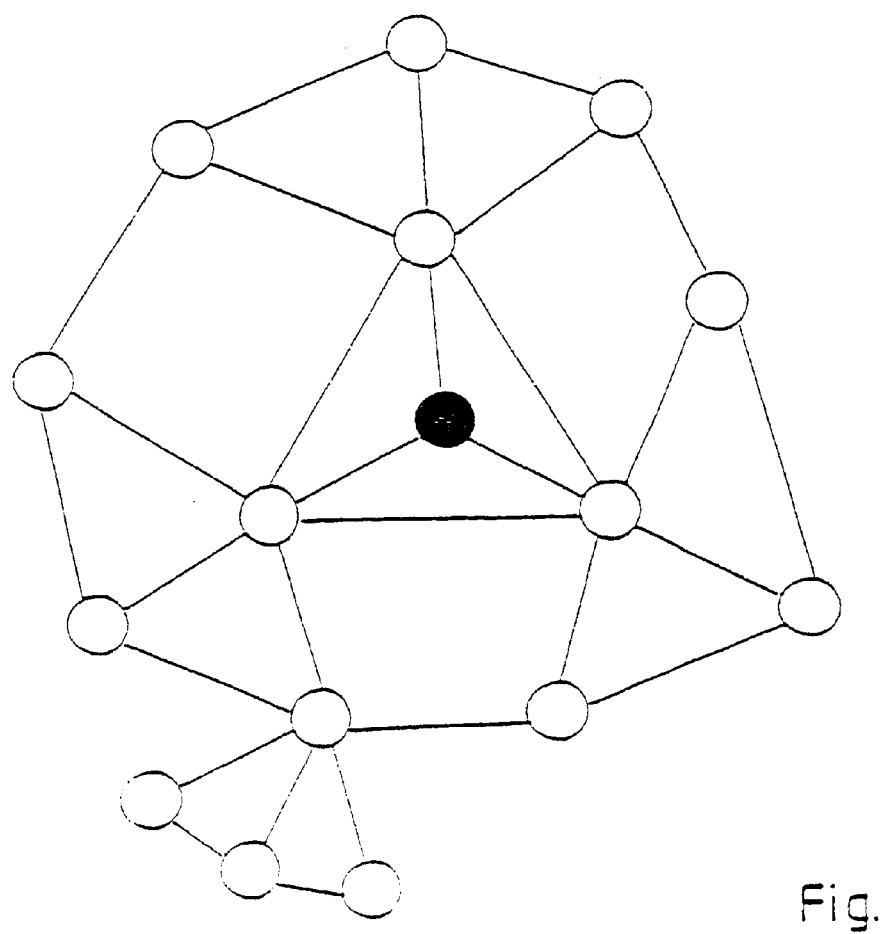
FIG. 2 shows a topology of a two-dimensional neural network.

In FIG. 2, an example of a two-dimensional neural network is displayed, in which, starting from a central neuron with a darker representation, each further ring area around the central neuron exhibits an increase of the number of neurons by the factor three. The central neuron, and the edge neurons possess a neighborhood with sets of three neurons, whereas the remaining neurons exhibit a neighborhood with sets of six neurons. In this cobweb-shaped configuration of the neurons, the balanced dependence of the neurons on each other is advantageously ensured. For an automatic increase of the number of neurons according to claim 14, a further ring of neurons can be created by increasing the number of edge neurons by the factor three.

It is clear that the design of the neural network is arbitrary. Most different embodiments are conceivable, from one-dimensional nets (chains) up to three-dimensional structures with different neighborhood coupling.

It is advantageous for allowing a good graphical representation of the result data sets, if the neural nets. exhibit a scaling assignment which represents the neighborhood relations.

In a chain of neurons, this can be achieved, for example, by grey-shading the succeeding ordinal number (classes). In two-dimensional structures, as for example in the cobweb-shaped neural net displayed in FIG. 2, the ordinal numbers are advantageously computed according to claim 21 in polar co-ordinates around the central neuron at the origin. Thus, a unique assignment of colors can be achieved for the graphical display, which as well graphically reflects the neighborhood proximity by similar hues, or color saturations, respectively. The same applies to three-dimensional structures, where according to claim 22 the ordinal numbers are computed in spherical co-ordinates around a neuron in the center, and where subsequently the three spherical co-ordinates are related to hue, saturation, and intensity for a graphical representation, and thus graphically represent the neighbourhood relations as well.

Figure 3:
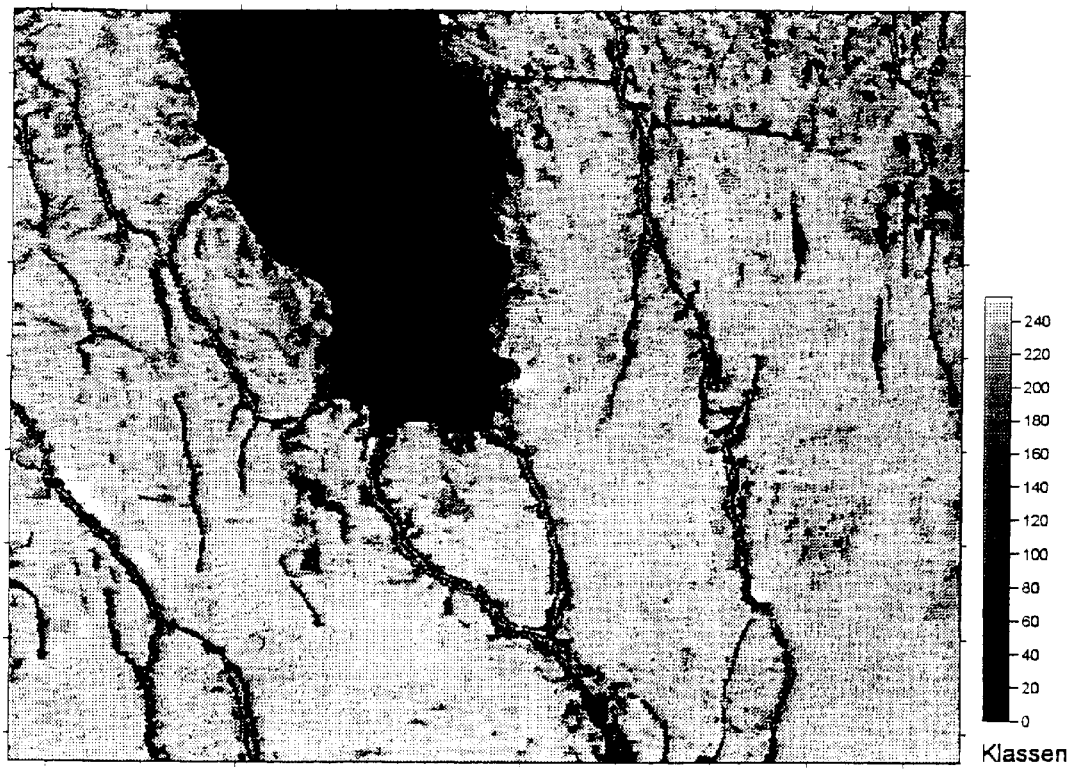
FIG. 3 is a representation as a two-dimensional map from a result data set according to the invention.
Figure 4:
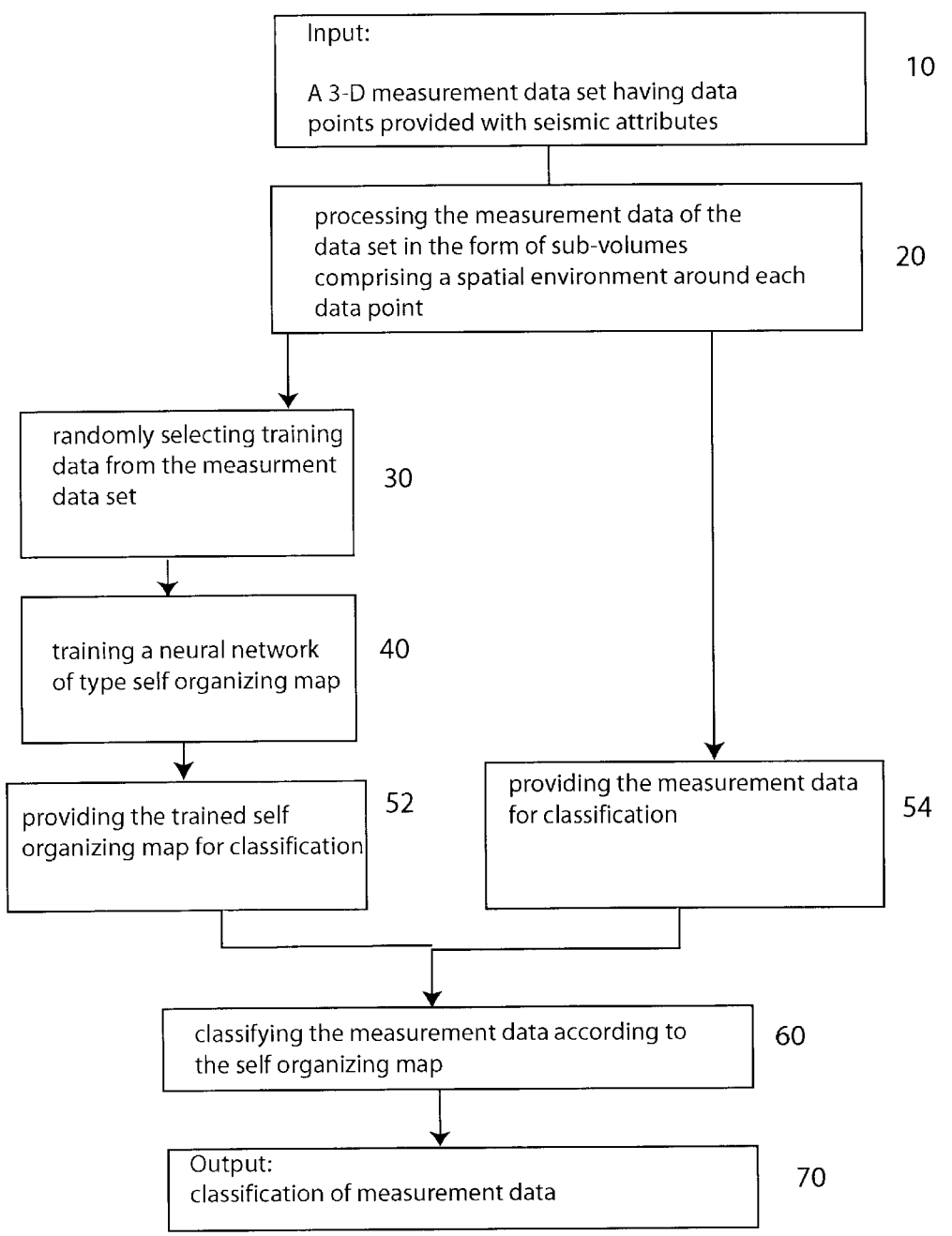
FIG. 4 is a flow chart of the process for processing seismic measurements.

In FIG. 3, the result of a neural classification as defined by the invention, is displayed by means of a horizontal map. In this map, the automatically detected fault zones in a depth region of approximately 3700 m are displayed.

In step 10, data is input into the system which includes a 3D measurement data set from the area to be investigated which serves as the starting point for the procedure according to the invention. Next, step 20 includes processing the measurement data of the data set in the form of sub-volumes comprising a spatial environment around each data point. The size of a sub-volume is defined by a reference point, by the defined number of further measurement data points (samples) that are located around the reference point, and by the relative location of these further points with respect to the reference point. In the example presented in FIG. 3, the sub-volumes possess an extension of 5 traces×5 traces×12 milliseconds, at a sampling rate of 4 milliseconds, and a trace distance of 25 m. The square-stone-shaped sub-volume thus comprises 5×5×3 data points (corresponding to 75 samples), which are referenced to the central measurement data point (reference point).

In this case, a neural network is pre-defined with the number and configuration of neurons. In the presented example, a chain configuration is selected, where the number neurons is fixed definitively only after the training.

Step 30 includes randomly selecting training data from the measurement data set. Depending on the problem formulated for the processing, the selection of the training patterns is then restricted. Since in the example presented here, the problem was formulated to be the automatic detection of fault zones in a depth region of approximately 3700 m, the training patterns were randomly selected from a window (time slice) of size 200 ms in this region. It was furthermore merely prescribed for this selection, that 1000 training patterns are used for the training.

Step 40 includes training a neural network in the form of a self-organizing map. The selected training patterns are applied to the neural net, one after other. For the first training run, the weight vectors are in this context filled with random numbers. The dimension of the weight vectors is given by the dimension of the considered sub-volumes, 75 in this case, and it is not altered anymore in the subsequent procedure.

Now the training data are presented to the self-organising map in the form of sub-volumes. A first adaptation step takes place according to the learning method of the self-organizing map. The training is repeated, i.e., the training patterns are also presented to the self-organizing map several times, until a pre-defined error criterion is fulfilled, or a previously defined number of steps is reached. 10000 steps are necessary in the presented example of FIG. 3. Very often, significantly more adaptation steps are required.

The weight vectors are now determined, and they cannot be altered anymore. The trained neural map has to be regarded as the central result for the further processing. In the presented application example of FIG. 3., the number of classes (neurons) is 256.

Now, step 52 includes the step of providing the trained self organizing map for classification. Simultaneously, step 54 provides the measurement data for classification. Then step 60, includes the process of classifying the measurement data according to the self-organizing map. The whole 3-D measurement data volume is classified by extracting sub-volumes for every measurement data point. All these input patterns, i.e. the training patterns and the sub-volumes that were not used for training before, are now one after another presented to the neural network, and the ordinal number (here 0–255) of the winner neuron is determined. Additionally, the distance between the input pattern and the weight vector is computed as a measure for the quality of the classification, and it is added to the result data set. Thus, the result data set represents the output of the system in step 70, comprising the ordinal number of the winner neuron, and measure for the quality of the classification, for each measurement data point.

In the presented application example, the results were extracted from the classified result data set along a geological horizon. With this data, a horizontal map was constructed, where the ordinal number (class) that was assigned to each displayed measurement data point, is represented by a grey-shade corresponding to the distribution into classes.

In this context, the fault zones are clearly emphasized by a darker representation in FIG. 3. In the northern part of the map, and around the edge of the salt dome that is displayed in black colour, different classes appear with respect to the remaining area. This allows to infer regional differences in the characteristics of the seismic data.

On the whole, the procedure defined by the invention represents an automatic processing method for seismic data, in which a reliable classification of seismic data is achieved that is largely independent of the user's judgement. A user-independent processing is carried out after a predefinition of certain boundary values, like the size and shape of the sub-volumes, the number of training data, and, if need be, the restriction of the selection region, and the prescription of an error criterion. In this context, the training is repeated for such a duration, until the results fall below an error criterion. If needed, the distribution into classes is dynamically altered.

By the processing, similar three-dimensional signal distributions are assigned to one class, or to neighboring classes. Because of three-dimensional sub-volumes being considered, this assignment is dependent on the environment, and independent of the subjective impression of an interpreter.

Certain characteristics can be combined with the classification, by assigning known characteristics of the training examples via acertain relation, e.g. as weighted mean, geometrical mean, maximum value, etc. Examples for these characteristics are: reservoir characteristics like porosity or permeability, influence of faults, lithology, data quality, or characteristic parameters from 3-D volume operators as well.

The classification allows a statistical evaluation for each ordinal number, too. Apart from that, the neurons with similar characteristics can be combined in units comprising several neurons. For example, all neurons that represent seismic patterns near, or in fault zones, form a unit. In order to be able to determine the similarity of neurons, the length of the difference vector, or the scalar product of two neurons can be computed for each connection between two neurons. This value represents a measure for the similarity of the weight vectors, and allows an objective evaluation.

Accordingly, while only a few embodiments have been shown and described, many modifications and changes may be made thereunto without departing from the spirit and scope of the invention as described in the appended claims.

What is claimed is:

1. A method for processing and classifying a 3-D measurement data set provided with seismic attributes, by means of a neural network, comprising:

training a self-organizing map by selecting training data, said training data being randomly selected from a measurement data set; and classifying data to be investigated according to the self-organizing map wherein for each measurement data point, of a considered measurement data volume, a classification number is assigned, which is an ordinal number of a winner neuron in the neural network;

wherein the measurement data are processed in the form of sub-volumes, comprising a spatial environment of each measurement data point.

2. The method according to claim 1, wherein each sub-volume comprises a reference point and a pre-defined number of measurement data points from an environment of the reference point, and the pre-defined relative location of these points with respect to the reference point.

3. The method according to claim 2, wherein a dimension of weight vectors used in the neural net corresponds to the number of data points in the sub-volumes.

4. The method according to claim 3, wherein the sub-volumes possess a square stone shape and comprise at least 3×3×3 data points.

5. The method according to claim 3, wherein the sub-volumes possess a shape of an ellipsoid having main axes centered at the reference point.

6. The method according to claim 1, wherein the selection of the training data is restricted to pre-defined inclines and crosslines of the measurement data set.

7. The method according to claim 1, wherein the training data are randomly selected from a target layer of the measurement data set, where the target layer is defined by two enclosing horizons.

8. The method according to claim 1, further comprising the steps of determining characteristic parameter values for all sub-volumes of the measurement data set, and selecting training data according to predefined criteria that are derived from the characteristic parameter values.

9. The method according to claim 8, further comprising the steps of determining a distribution of the characteristic parameter values from all sub-volumes of the measurement data set, and selecting the training data so that the distribution of the characteristic parameter values from the training data corresponds to the total distribution.

10. The method according to claim 8, further comprising the step of determining a distribution of the characteristic parameter values from all sub-volumes of the measurement data set, and selecting the training data such that the distribution of the characteristic parameter values from the training data corresponds to a previously selected distribution.

11. The method according to claim 1, wherein further comprising the step of assigning weight vectors to each data point which are filled with random numbers at the start of the training step.

12. The method according to claim 1, further comprising the step of assigning weight vectors to each data point which are adopted from an earlier, similar computation.

13. The method according to claim 1, wherein the step of training is carried out until a pre-defined error criterion is fulfilled.

14. The method according to claim 1, wherein a number of network connections of the neurons in the neural network are changed during the training step, based upon error criteria.

15. The method according to claim 14, wherein the neural network is a two-dimensional grid configuration.

16. The method according to claim 14, wherein the neural network is arranged in the form of a torus.

17. The method according to claim 14, wherein the neural network is embodied by at least one chain.

18. The method according to claim 14, wherein the neural network is arranged in a three dimensional grid.

19. The method according to claim 1, wherein each neuron possesses a unique ordinal number, and wherein for each measurement data point, a corresponding ordinal number of a winner neuron, and an individual error, given as a distance between the measurement data point and the winner neuron, are assigned as a result data set.

20. The method according to claim 19, further comprising the step of extracting maps or slices from the result data set for a 2D display.

21. The method according to claim 19, wherein in case of a two-dimensional neuron configuration, ordinal numbers of neurons are computed as polar co-ordinates, where an angle co-ordinate of a neuron determines a hue, and a radius determines a saturation.

22. The method according to claim 19, further comprising the step of deriving, hue, saturation and intensity from ordinal numbers computed in spherical co-ordinates with a three-dimensional neuron configuration.

23. The method according to claim 1, further comprising the step of forming an input data set which can be derived from seismic data selected from the group consisting of volume of acoustic impedance, coherency, dip and azimuth.

* * * * *